Dec. 1, 1964  N. P. SUH ETAL  3,159,698
METHOD FOR MAKING AND FORMING PLASTIC MATERIAL
Filed Dec. 1, 1960  2 Sheets-Sheet 1
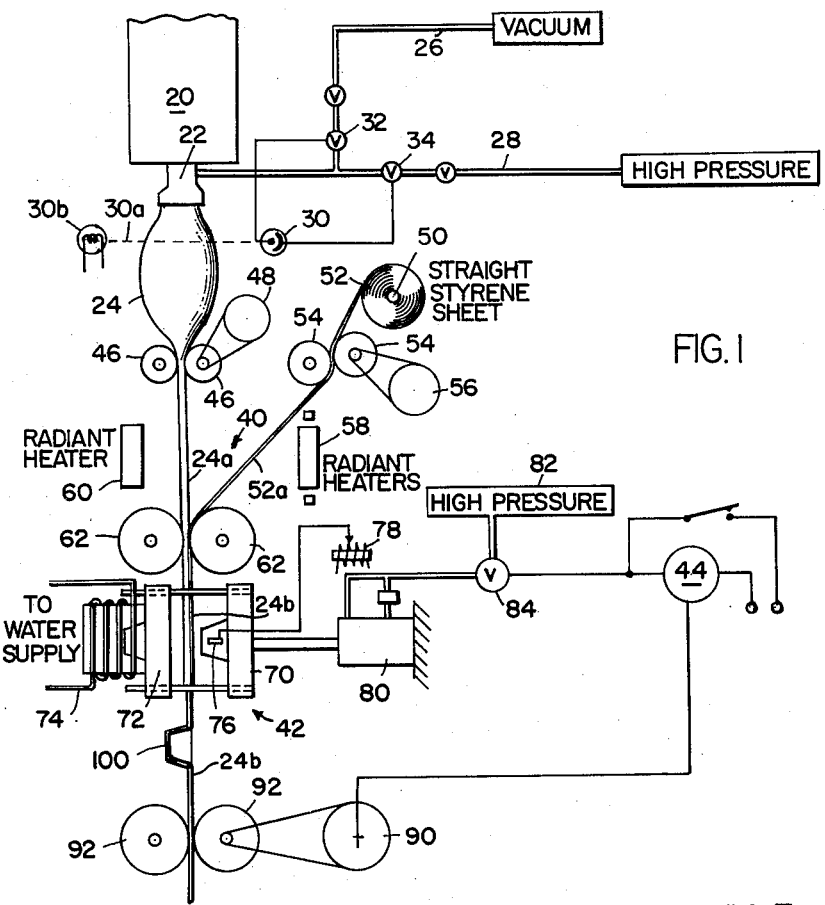
FIG. 1
FIG. 3
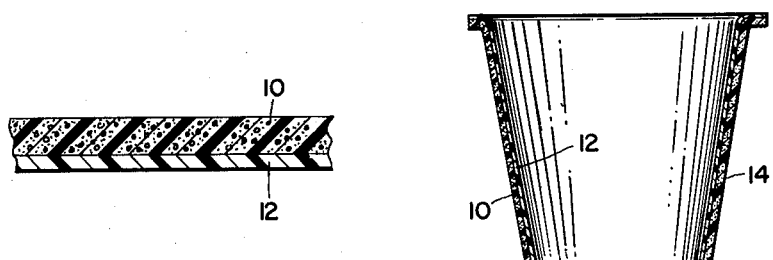
FIG. 2
INVENTORS
NAM P. SUH
DAVID F. STEWART
BY RALPH M. LAMADE
Ezekiel Wolf, Wolf + Greenfield
ATTORNEYS Dec. 1, 1964    N. P. SUH ETAL    3,159,698
METHOD FOR MAKING AND FORMING PLASTIC MATERIAL
Filed Dec. 1, 1960    2 Sheets-Sheet 2

INVENTORS
NAM P. SUH
DAVID F. STEWART
BY   RALPH M. LAMADE
Ezekiel Wolf, Wolf + Greenfield
ATTORNEYS United States Patent Office 3,159,698
Patented Dec. 1, 1964

3,159,698
METHOD FOR MAKING AND FORMING PLASTIC MATERIAL
Nam P. Suh, Cambridge, David F. Stewart, Framingham, and Ralph M. Lamade, Concord, Mass., assignors to Sweetheart Plastics Inc., a corporation of Maryland
Filed Dec. 1, 1960, Ser. No. 73,081
4 Claims. (Cl. 264—210)

This invention relates to the manufacture of plastic articles and more particularly comprises a new and improved method for making and molding a plastic laminate.

In recent years manufacturers of disposable food containers of all types have experienced a tremendous increase in the demand for their products. This increased demand is in large part the result of the rapidly growing use of vending machines which now merchandise virtually all forms of food and drink from coffee to full course dinners.

The manufacture of disposable containers has until recently been confined to those who make paper products, as paper has been the major material used in such goods. However, it is now recognized that disposable containers made of plastic have many desirable features not found in the paper counterparts, and constant research is being conducted to discover ways to make the plastic products economically competitive with those made of paper.

Several problems arise in providing very inexpensive plastic cups which will not, when filled with hot drinks such as coffee, become soft and pliable and lose their shape, and become so hot at the outer surface that the container cannot comfortably be handled. Foam plastics are known to possess the insulating properties which permit one side of even a thin foam sheet to be handled while the other side of the sheet is in contact with very hot substances. However, while foam plastics have the necessary insulating properties, they normally lack the rigidity of unfoamed plastic sheet material and often give off volatiles that migrate to the substances in contact with them. We have discovered that the quality of cups may be markedly improved by forming them from a plastic laminate of film and foam.

One important object of our invention is to provide an economically practical and physically sound method of manufacturing a foam-film laminate.

Another important object of our invention is to provide a practical method of molding containers such as cups from a laminated foam-film sheet.

Another important object of our invention is to produce an extremely inexpensive cup which will not physically deteriorate when filled with hot liquids and which possesses the necessary insulating properties so that it may be handled without any discomfort regardless of the temperature of the contents.

To accomplish the several objects of our invention we provide a process wherein foamed polystyrene is extruded in the form of a tube whose size is controlled automatically. The tube is fed between a pair of nip rolls which reshape the material into a flat sheet. A roll of polystyrene film is fed simultaneously with the foam sheet between pressure rollers that serve to bond mechanically the double ply of foam and the layer of polystyrene film. Heaters are used to control the temperature of the film prior to its entry between the pressure rollers to insure a proper bond between the foam and film. After the laminate is formed, it is fed between matched molds which form the containers and thereafter, the shaped containers are cut from the sheet and are ready for packaging. In this process, polystyrene has several advantages over other plastic materials available. Most important the material is relatively inexpensive. Furthermore, considerable information is available relating to the manner in which it is handled, and the material sets rapidly upon cooling. The polystyrene used may be of virtually any variety such as general purpose styrene, rubber filled styrene, or a copolymer system. While one type of material may have certain advantages over others, they all perform satisfactorily in the manufacturing process which we have invented.

Preferably, the containers are formed with the plastic film on the inside as a liner in contact with the container contents. Several advantages are derived from this arrangement. The film on the inner surface prevents any of the contents of the container from entering the outer cells of the foam layer. The film, unlike the foam, does not give off any volatiles which may affect the taste of the container contents. The foam has a three dimensional appearance which gives to the product a certain richness. The foam is particularly comfortable to the touch and will, when hot liquid is in the container, elevate but slightly in temperature. The slight rise in temperature is psychologically desirable.

These and other objects and features of our invention will be better understood and appreciated from the following detailed description, read in connection with the accompanying drawings, in which:

FIGURE 1 is a diagrammatic representation of a method of and apparatus for forming containers of a polystyrene foam-film laminate;

FIGURE 2 is a cross sectional view of a laminated sheet formed by the process and apparatus suggested in FIGURE 1;

FIGURE 3 is a cross sectional view of a cup constructed from the laminate shown in FIGURE 2.

Figure 4:
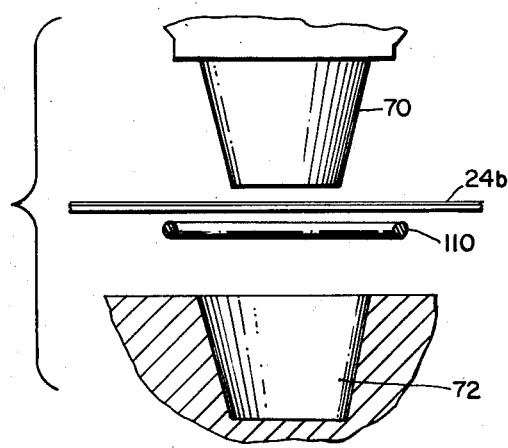
FIGURES 4–6 are diagrammatic views illustrating the operation of the container forming assembly which forms part of the apparatus of FIGURE 1.

The word "film" used throughout this specification to identify one layer of the laminate is not to be construed in any way to limit the thickness of that layer.

In FIGURE 3 we show a cup made of a polystyrene foam-film laminate. That laminate is shown in detail in FIGURE 2. The laminate includes a foam layer 10 and a film layer 12 mechanically bonded together by means described in detail below. The foam layer 10 as well as the film 12 may be composed of any polystyrene, and any foaming agent may be employed which produces a closed cell structure. The foam density preferably is in the range of five to twenty pounds per cubic foot. The density of course may be varied within limits by varying the amount of foaming agent added to the plastic.

In FIGURE 3 the foam layer 10 forms the outer ply of the cup while the inner surface of the cup is lined with the film 12. A cup so formed will have desirable insulating properties and strength if the lamination thickness is approximately .040 inch composed of .030 inch of foam and .010 inch of straight polystyrene. Such a cup filled with boiling water will be just slightly warm to the touch on the outer surface 14, and the boiling water will not soften the material or cause any distortion. Surveys have indicated that the public desires some transfer of heat through the walls of a container of this type although, of course, the heat should not be so great as to make the outer surface uncomfortable to the touch. The slightly elevated temperature is perhaps desirable because it is expected, as some heat is transferred even through glass and ceramic materials from which nondisposable containers are made.

The cup shown in FIGURE 3 may readily be fabricated by the process diagrammatically shown in FIGURE 1. In FIGURE 1, an extruder 20 carries a tubing die 22 that continuously extrudes a tube 24 of low density foam plastic. The density of the foam may be adjusted by varying the quantity of foaming agent in the polystyrene, the extruder temperature, and/or the roll pressure.

A vacuum line 26 and an air pressure line 28 are connected to the tubing die 22 to control the diameter of the extruded tube 24. A number of photoelectric cells schematically represented by the single photoelectric cell 30 shown, control valves 32 and 34 in the vacuum and air pressure lines, respectively. The photoelectric cells serve to open the valve 32 to exhaust gas within the tube so as to reduce the tube size and to open the valve 34 in the air pressure line so that gas will enter the tube to increase its diameter. The sight line 30a between the light source 30b and cell 30 is interrupted when the radius of the tube 24 exceeds a selected dimension determined by the distance between the tube axis and the sight line.

As the tube is extruded, gases are generated within the tube by the foaming agent, and it is necessary to control the quantity of gas within the tube to control the tube size. Valve 32 remains closed and prevents the escape of gas from within the tube so long as the tube does not exceed a certain diameter determined by the position of the photoelectric cells and light sources. Similarly, the valve 34 remains closed preventing the introduction of additional air into the tube so long as the diameter does not fall below the certain minimum value. Obviously, both valves remain closed when the tube diameter is within certain acceptable limits. The two valves will never be opened simultaneously.

The extruder 20 and its associated parts cooperate with the laminating assembly 40 and the forming assembly 42 to produce the finished product, namely, the cup shown in FIGURE 3. A program timer 44 serves generally to control the operation of the forming assembly 42 and the rate at which the laminated material is fed to it from the laminating assembly 40. This will become apparent below.

The extruded tube of foam plastic 24 is directed between a pair of nip rolls 46 driven by motor 48. The nip rolls 46 collapse the tube to form in effect a double ply of foam with the layers mechanically bonded together as a single foam sheet. The nip rolls 46 are disposed adjacent the nozzle 22 so that the foam has no appreciable opportunity to cool before entering between the rolls. As a result, the two layers of the tube, that is, the opposite sides of the cylinder, adhere firmly and no separation of the layers later results.

A spindle 50 carries a roll of polystyrene film 52 to be laminated with the foam sheet emerging from the nip rolls 46. A set of drive rollers 54 driven by motor 56 feeds the polystyrene film continuously in front of radiant heaters 58. The radiant heaters 58 condition the film 52a for bonding with the foam. Simultaneously, radiant heater 60 disposed adjacent the path followed by the foam sheet 24a after leaving the nip rolls 46 directs heat to the foam before lamination. Thereafter, the sheet and film are fed between press rollers 62 which laminate the two layers together. After the laminated sheet 24b is formed by the press rollers 62, the sheet is fed continuously to the forming assembly 42. The foam plastic does not have an opportunity to set before entering between the pressure rollers 62. The radiant heaters 58 condition the film to make the bonding possible. The radiant heater 60 which directs heat to the foam is not a necessary step in preparing the foam for lamination but rather is used to maintain the temperature of the foam at a level which permits it to be molded after lamination by the forming assembly 42. As will be explained in detail below, the various temperatures of the materials at the different stages of the manufacturing process are interrelated and the several heating operations cooperate with one another to assure that the materials are in proper condition for each of the steps of the process.

Forming assembly 42 includes a matched mold having male die 70 and female die 72. The temperature of the female part is controlled by water cooling system 74 while the temperature of the male part 70 is controlled by a heating element 76 connected in circuit with rheostat 78. As is suggested in the drawing, the male die 70 is actuated by means of a piston and cylinder 80 in turn controlled by air pressure source 82 and valve 84. The valve 84 which interconnects the high pressure air source and the cylinder and piston assembly 80 is controlled by the program timer 44 that also controls the motor 90 which drives the feed rollers 92. The program timer 44 will open the valve 84 to actuate the male die 70 and simultaneously stop the feed rollers 92 so that the cup 100 may be formed. Thereafter, any convenient means may be employed to sever the cup from the sheet.

Figure 5:
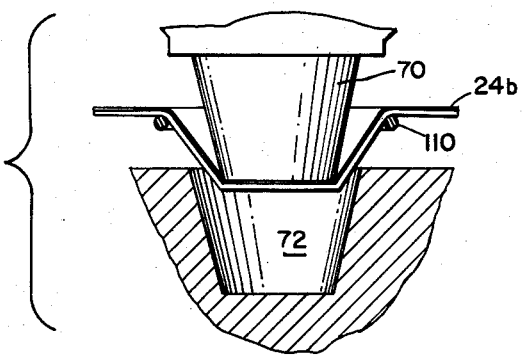
Figure 6:
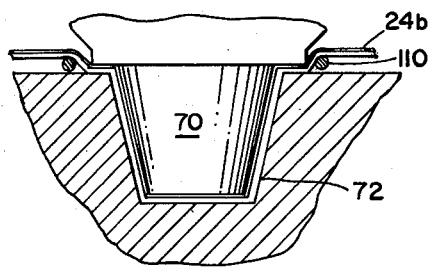

We have indicated that the density of the foam is very low, which reduces material costs and enhances the insulating characteristics of the product. To preserve the low density of the material, it is necessary to avoid compression of the foam during the molding or forming operation. To avoid compression of the material we prestretch the laminated sheet 24b to reduce its thickness so that it is within the range of the cavity thickness between the mated male and female dies. This operation is suggested in FIGURES 4 to 6. In FIGURE 4 the male die or plug 70 is shown approaching the laminated sheet 24b that overlies a ring 110 adjacent the mouth of the female cavity 72. As the plug approaches the cavity, it first engages the laminate and stretches the material in a local area defined by the ring 110. This stretching continues until the male plug with the laminate fills the cavity.

The ring 110 should be small enough so that dragging of the laminate over the mouth of the cavity is avoided, and the ring should not be so small as to cause excessive thinning out of the material.

The heating element 76 and the water cooling system 74 enable an operator to control separately the temperature of each part of the mold. Generally, the element 76 is provided in the male part because that part of the die in effect performs the work in molding the container. When the stock finally engages the female cavity, the molding operation is completed and it is therefore desirable to cool the material to accelerate setting.

In the foregoing paragraphs we have set forth a general description of the method and apparatus employed in the manufacture of the laminated foam-film material and the container. In the following paragraphs we will describe some of the details of the process which contribute to the success of our invention.

The pliability of the foam sheet which permits it to be molded or shaped by the forming assembly 42 must be carefully controlled. The formability of the foam is determined solely by the stock temperature, and, therefore, it is necessary that the temperature of the foam be within a limited prescribed range when it reaches the forming assembly 42. The temperature of the foam is also of some importance during the laminating operation. It is somewhat easier to laminate the film to the foam before the foam sets, although the lamination may be accomplished albeit with some inconvenience after the foam sets, so long as the film is heated.

The average ideal stock extrusion temperature is somewhat less than the ideal stock forming temperature. For example, the average ideal stock extrusion temperature is 240–250° F. while the ideal stock forming temperature is in excess of 300° F. In order to avoid the necessity of substantial reheating of the material after it is formed, that is, after the foam has been extruded, which may cause the cells of the foam to collapse, we initially heat the stock to a temperature in excess of that required for extrusion to establish a reservoir or supply of heat in the material which is available when the material is molded. Thus, we extrude the material at a temperature of between 300° and 320° F. and rapidly pass it through the nip rolls and pressure rollers to the forming assembly 42. We avoid temperatures in excess of 320° F. as above that temperature disintegration takes place. The radiant heaters 60 direct additional heat to the surface of the material. The surface heating is necessary because at that location the major heat loss occurs. Because the material is initially supplied with an excessive amount of heat and is thereafter fed rapidly to the forming assembly from the extruder, and because the material is supplied with a supplementary heating between extruding and molding, the laminate may readily be formed without tearing the material during molding and without experiencing any appreciable deterioration of the cell structure of the foam.

In the foregoing specification we have described fully the method and apparatus which we have invented to manufacture the cups shown in detail in FIGURE 3. It will be appreciated that by the method and apparatus disclosed we achieve the several objects of our invention. We provide an inexpensive cup having the appearance, strength and insulating properties which make it suitable for use in all forms of vending machines. By maintaining the density of the foam at a minimum, we reduce the cost of materials and maximize the insulating properties. By laminating the foam to film, the required stiffness is imparted to the product. The film lying on the inside of the cup acts as a liner and prevents volatiles in the foam from migrating to the cup contents. By selecting polystyrene as the material used, manufacturing problems are reduced to a minimum.

Having read the foregoing description, those skilled in the art will appreciate that modifications may be made not only of our product but of the method and apparatus used to produce it without departing from the spirit of our invention. For example, the method and apparatus described may be applied in the manufacture of cups made of plastic foam alone, and the teachings herein suggest that the laminating step may be performed simultaneously with the forming operation on the molding assembly 42. The particular types of heaters suggested are merely exemplary of the different types of equipment which may be used. Therefore, we do not intend to limit the breadth of our invention by the foregoing specific description, but rather, it is our intention that the breadth of our invention be determined by the appended claims and their equivalents.

What we claim is:

1. A method of making a container comprising the steps of extruding a tube of polystyrene foam at a temperature between 300° and 320° F., passing the tube between pressure rollers before the foam sets to collapse the tube and form a thin foam sheet, providing a sheet of polystyrene film, heating the film to condition it for bonding to the foam and heating the surface of the foam sheet to maintain its temperature between 300° and 320° F., thereafter mechanically bonding the film and the sheet together to form a laminate, and match molding the laminate into a container before the foam cools.

2. A method of forming a foam-film laminate comprising the steps of extruding a foam tube, passing the tube between nip rolls to collapse the tube before it sets to cause the two sides of the tube to mechanically bond together, providing a film, heating the film to condition it for bonding to the collapsed foam tube, and feeding the conditioned film and sheet between pressure rollers to bond them together.

3. A method of making a plastic article comprising the steps of extruding a tube of foamed plastic material at a stock temperature suitable for forming the foamed plastic material to establish a heat reservoir in the material available when the material is formed, collapsing the tube immediately after extruding and before the material cools to cause the two sides of the tube to mechanically bond together, maintaining the temperature of the foam at the value suitable for forming, laminating a sheet to the collapsed tube, and thereafter forming the laminated sheet into the article while the temperature of the foamed plastic material is maintained by utilizing the heat reservoir.

4. A method of making a plastic article comprising the steps of extruding a tube of foamed plastic material at a stock temperature suitable for reshaping the foamed plastic material to establish a heat reservoir in the material available when the material is reshaped, collapsing the tube immediately after extruding and before the material cools to cause the two sides of the tube to mechanically bond together, continuously maintaining the temperature of the foam at a value suitable for reshaping, and reshaping the material into the article utilizing said heat reservoir while the temperature of the foamed plastic material is maintained.

References Cited in the file of this patent

UNITED STATES PATENTS

| | | |
|---|---|---|
| 2,134,754 | Flint et al. | Nov. 1, 1938 |
| 2,405,528 | Skolnik | Aug. 6, 1946 |
| 2,410,857 | Ahern | Nov. 12, 1946 |
| 2,452,999 | Daly et al. | Nov. 2, 1948 |
| 2,499,399 | Lyon | Mar. 7, 1950 |
| 2,791,801 | Szantay | May 14, 1957 |
| 2,815,309 | Ganahl et al. | Dec. 3, 1957 |
| 2,853,222 | Gallagher | Sept. 22, 1958 |
| 2,917,217 | Sisson | Dec. 15, 1959 |
| 2,932,437 | Wilcox | Apr. 12, 1960 |
| 3,018,882 | Ferguson | Jan. 30, 1962 |

OTHER REFERENCES

S.P.E. Journal, Controlled Density Polystyrene Foam Extrusion, vol. 16, No. 7, July 1960, pp. 705–709.